Jan. 3, 1950 W. F. SMITH 2,493,466

PHONOGRAPH SYSTEM AND STYLUS THEREFOR

Filed July 10, 1946

William F. Smith
INVENTOR.

BY Orel R. Godlaw
ATTORNEY.

Patented Jan. 3, 1950

2,493,466

UNITED STATES PATENT OFFICE 2,493,466

PHONOGRAPH SYSTEM AND STYLUS THEREFOR

William F. Smith, North Hollywood, Calif., assignor to Radio Corporation of America, a corporation of Delaware Application July 10, 1946, Serial No. 682,530

6 Claims. (Cl. 179—100.4)

This invention relates to sound reproducing equipment, and particularly to the needle or stylus construction of a disc phonograph.

In sound reproduction from disc records, many types of styli have been proposed and used. In some instances, the manufacturers of the needle recommend that it be used for reproducing one record only, while so-called permanent types of needles have been proposed, the latter being made of alloys providing particularly hard points. Some use sapphire points. It has been found, however, that such permanent types of styli are not completely satisfactory in that the hard points do chip and they have a tendency to unduly wear the grooves of the records. Thus, a softer pointed type of needle is preferred, particularly in the reproduction of records made of the softer materials, such as home recorded or instantaneous playback recordings. These soft needles, of course, wear rapidly and must be replaced, and if not replaced, they cause undue wear of the record grooves and distorted reproduction.

The present invention is directed to a needle or stylus construction which permits the needle to indicate when it is worn to the point where it should be replaced by a new one. This indication is in the form of a circuit break which discontinues the reproduction of the record being played.

The principal object of the invention, therefore, is to facilitate the reproduction of sound from disc records.

Another object of the invention is to provide an improved method of and means for determining when a needle or stylus should be replaced with a new one.

A further object of the invention is to provide an improved needle or stylus construction for a phonograph reproducer.

A still further object of the invention is to provide an improved method of and system for indicating the time when the needle of a sound pickup should be replaced.

Although the novel features which are believed to be characteristic of this invention will be pointed out with particularity in the appended claims, the manner of its organization and the mode of its operation will be better understood by referring to the following description read in conjunction with the accompanying drawings, forming a part hereof, in which:

Figure 1:
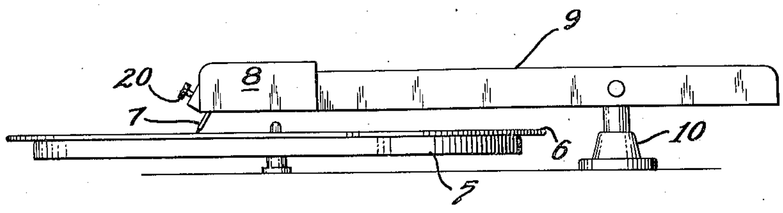
Fig. 1 is a side view of a sound reproducer tone arm and disc record.

Referring to the drawings, in which the same numerals refer to like elements, a phonograph turntable 5 is shown having a record 6 thereon. In the grooves of the record is a needle or stylus 7 positioned in a pickup head 8 mounted on the end of a tone arm 9 pivoted on a support 10. The pickup 8 may be either of the electro-magnetic type, in which vibrations of the needle 7 introduce a varying electro-motive force in a coil, or of the crystal type, in which voltage variations are produced on a pair of electrodes corresponding to the pressure applied to the crystal due to the vibrations of the needle.

Figure 2:
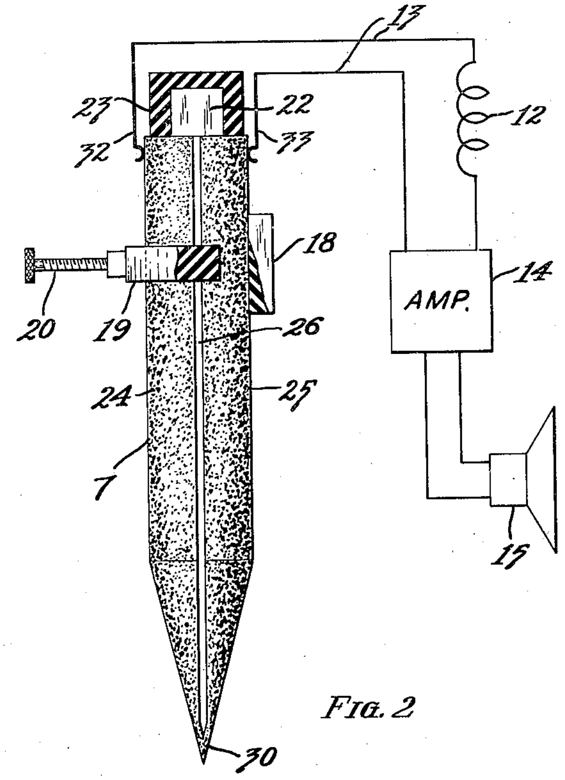
Fig. 2 is a diagrammatic illustration of the needle or stylus of the invention and the circuit therefor.
Figure 3:
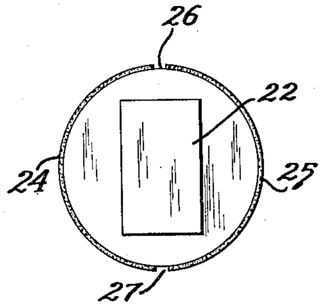
Figs. 3 and 4 are end views of the needle of the invention.
Figure 4:
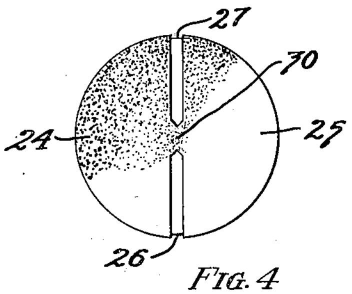

In Fig. 2, the pickup coil or resistor is represented at 12 in the conductors 13 feeding the amplifier 14, which, in turn, feeds a loudspeaker 15. Shown positioned between a fixed block or anvil 18 and a V-shaped vise jaw 19 adjustable by a threaded thumb nut 20 is the needle 7 of the invention. The shank end 22 of the needle is made rectangular, as shown in Fig. 3, so that it may be inserted in the soundhead 8 in either of two positions only, the shank being accommodated in the socket 23. The vise jaws 18 and 19 and the socket 23 are of non-conducting or insulating material.

The sides of the needle 7 are sprayed with a metallic material or electro-plated with such material as shown at 24 and 25, leaving a narrow gap on both sides thereof, as shown at 26 and 27. However, at the point 30, the metallic coating extends completely around the surface of the needle, the distance from the tip of the needle to the grooves 26 and 27 being in the neighborhood of .0005 inch. The body of the needle 7 is of non-conducting material so that the circuit through the pickup unit 12 is completed through the metallic coating on the sides of the needle at 24 and 25 and at the tip 30, contact being made with the metallic coating through the resilient brush contacts 32 and 33. In a magnetic pickup, the metallic coating induces the energy into the coil, while in a crystal pickup, the pressure variations caused by movement of the stylus induces the desired voltages.

In the operation of the above system, the needle 7 is inserted between the vise jaws 18 and 19 and in the socket in the plug 23. Due to the rectangular shape of the socket, the needle will be positioned so that the gaps 26 and 27 in the metallic coating are positioned as shown in the drawing and the brushes 32 and 33 make a contact with respective coatings 24 and 25. This completes the circuit to the amplifier 14 over conductors 13. Now, when the tip of the needle 30 is worn down so that the tip is eliminated, and thus, the connecting metal break occurs between the coatings 24 and 25, reproduction of the record ceases. The operator is then aware that an entirely new needle should be substituted for the worn one. In this manner, the needles are used only during their optimum length of life for the best reproduction and not beyond the point where they cause damage to the record grooves.

I claim:

1. A phonograph stylus comprising a non-conducting body portion and a coating of conducting material extending along said body portion in two sections separated except at the tip of said body portion.

2. A phonograph stylus in accordance with claim 1, in which one end of said body portion is rectangular to limit said stylus to two operative positions.

3. In a phonograph system having a pickup element and reproducing elements, the combination of a stylus for detecting sound track modulations, said stylus comprising a non-conductive body and a pair of spaced metallic coatings interconnected at the point of said stylus, and a pickup circuit for said system including said coatings.

4. A phonograph system in accordance with claim 3, in which means are provided for limiting said stylus to two positions in said pickup element.

5. A phonograph system for indicating when the needle thereof should be replaced comprising a pickup element, reproducing elements fed by said pickup element, and a stylus having a pair of spaced conductive coatings interconnected over a predetermined length of the tip of said stylus, and a pickup circuit for said system including said coatings.

6. A phonograph system in accordance with claim 5, in which one end of said stylus is rectangular in shape to limit said stylus to either of two operative positions.

WILLIAM F. SMITH.

REFERENCES CITED

The following references are of record in the file of this patent:

UNITED STATES PATENTS

| Number | Name | Date |
|---|---|---|
| 1,511,860 | Winer | Oct. 14, 1924 |
| 2,199,923 | Miller | May 7, 1940 |
| 2,423,208 | Sinnett | July 1, 1947 |